US008577098B2

(12) United States Patent
Ito

(10) Patent No.: US 8,577,098 B2
(45) Date of Patent: Nov. 5, 2013

(54) APPARATUS, METHOD AND PROGRAM FOR DESIGNATING AN OBJECT IMAGE TO BE REGISTERED

(75) Inventor: Yoshinori Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 575 days.

(21) Appl. No.: 12/910,170

(22) Filed: Oct. 22, 2010

(65) Prior Publication Data
US 2011/0096995 A1 Apr. 28, 2011

(30) Foreign Application Priority Data

Oct. 27, 2009 (JP) ................................. 2009-247109

(51) Int. Cl.
*G06K 9/46* (2006.01)
(52) U.S. Cl.
USPC .......................................... 382/118; 382/190
(58) Field of Classification Search
USPC ........................................................ 382/190
See application file for complete search history.

(56) References Cited

U.S. PATENT DOCUMENTS

| 7,907,751 | B2 | 3/2011 | Asano |
| 8,396,262 | B2 | 3/2013 | Aisaka et al. |
| 2007/0160294 | A1 | 7/2007 | Asano |
| 2008/0247611 | A1 | 10/2008 | Aisaka et al. |
| 2008/0284900 | A1* | 11/2008 | Abe ............................. 348/349 |
| 2010/0066847 | A1* | 3/2010 | Suzuki et al. ............. 348/222.1 |
| 2010/0321539 | A1 | 12/2010 | Ito |
| 2011/0019066 | A1* | 1/2011 | Takano et al. ................ 348/345 |

FOREIGN PATENT DOCUMENTS

| CN | 1983303 A | 6/2007 |
| CN | 101281595 A | 10/2008 |
| JP | 2006-101186 | 4/2006 |

OTHER PUBLICATIONS

P. Viola and M. Jones, "Rapid Object Detection Using a Boosted Cascade of Simple Features," Proc. IEEE Conf. on Computer Vision and Pattern Recognition, vol. 1, Dec. 2001, pp. 511-518.
A.B. Ashraf, S. Lucey, and T. Chen, "Learning Patch Correspondences for Improved Viewpoint Invariant Face Recognition," Carnegie Mellon University, IEEE International Conference on Computer Vision and Pattern Recognition (CVPR), Jun. 2008.
B. Lucas and T. Kanade, "An Iterative Image Registration Technique with an Application to Stereo Vision," Proceedings of Imaging Understanding Workshop, pp. 121-130, Dated 1981.
N. Dalal and B. Triggs, "Histograms of Oriented Gradients for Human Detection," CVPR, 2005.
Mar. 29, 2013 Chinese Official Action in Chinese Patent Appln. No. 201010523231.2.

* cited by examiner

*Primary Examiner* — Stephen R Koziol
*Assistant Examiner* — Raphael Schwartz
(74) *Attorney, Agent, or Firm* — Fitzpatrick, Cella, Harper & Scinto

(57) ABSTRACT

An image processing apparatus comprising: a first detection unit adapted to detect a first subject from an object image; a first extraction unit adapted to extract a first feature amount for identifying an attribute of the first subject; a second extraction unit adapted to extract a second feature amount for detecting the second subject; a first storage unit adapted to store the first feature amount; and a second storage unit adapted to store the second feature amount, wherein when the first detection unit detects the first subject, the first extraction unit extracts the first feature amount and the first storage unit stores the amount, and when the first detection unit cannot detect the first subject, the second extraction unit extracts the second feature amount and the second storage unit stores the amount.

8 Claims, 9 Drawing Sheets

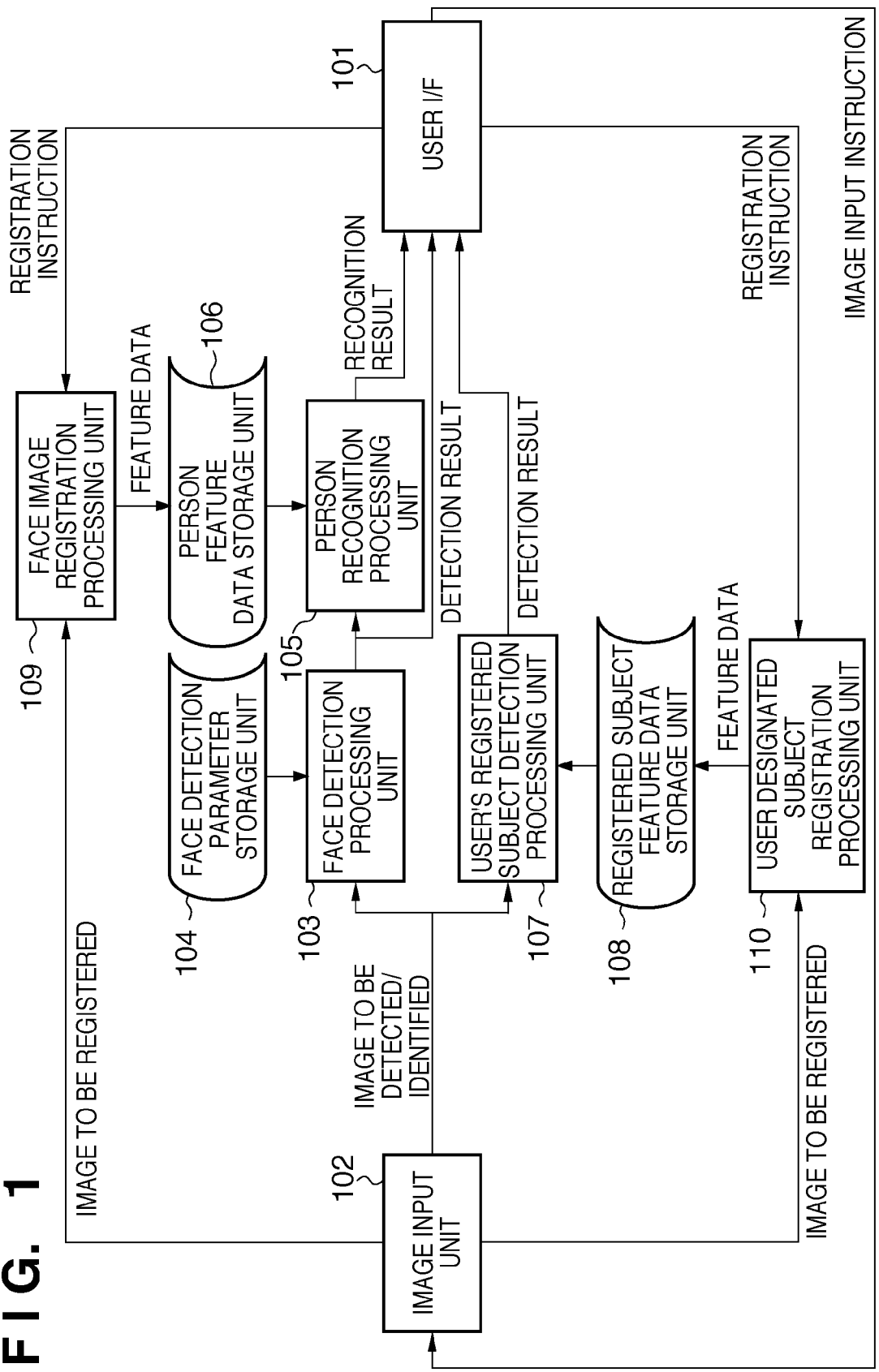

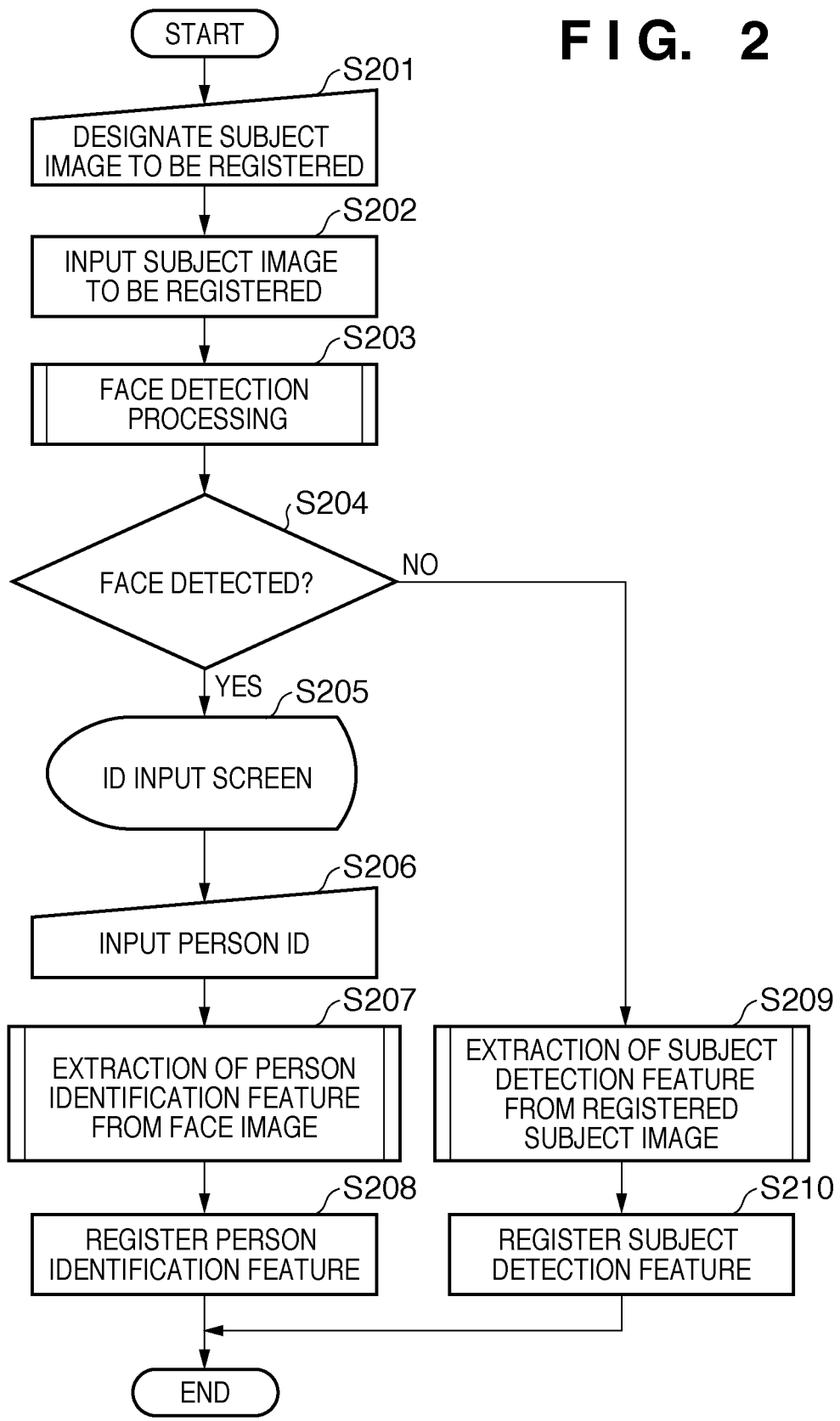

FACE WILL BE REGISTERED.
ENTER NAME.
[_          ]

OBJECT IS NOT PERSON'S FACE IMAGE.
DO YOU WANT TO REGISTER OBJECT
AS DETECTION TARGET SUBJECT?
[Y / N]

SCANNING OF SUBWINDOW →

APPARATUS, METHOD AND PROGRAM FOR DESIGNATING AN OBJECT IMAGE TO BE REGISTERED

BACKGROUND OF THE INVENTION

1. Field of the Invention

The present invention relates to an image processing apparatus, image processing method, and program for detecting a predetermined subject in an image and identifying its attribute.

2. Description of the Related Art

A face detection technique detects a person's face in an image and specifies its position and size (e.g., see P. Viola and M. Jones, "Rapid Object Detection using a Boosted Cascade of Simple Features", Proc. IEEE Conf. on Computer Vision and Pattern Recognition, Vol. 1, pp. 511-518, December 2001). Such techniques are widely applied to image capturing apparatuses such as digital cameras, printers for photo printing, and the like. Such techniques are used to, for example, determine a preferential target subjected to AE(Automatic Exposure)/AF(Auto Focus) control or smooth and soft skin processing.

Face image-based person recognition techniques determine whose face has been detected (e.g., see A. B. Ashraf, S. Lucey, and T. Chen, "Learning Patch Correspondences for Improved Viewpoint Invariant Face Recognition", Carnegie Mellon University, IEEE International Conference on Computer Vision and Pattern Recognition (CVPR), June 2008). With gradually improved precision, this technique is being installed in products such as a digital camera. Further, a technique of identifying an expression such as whether one smiles or opens his eyes, and a face attribute such as the face direction is under development, and is used for determination of a photo opportunity and the like.

In addition to these object detection/recognition functions regarding a human face, demand has arisen for a function (user's registered subject detection function) of designating an arbitrary subject the user wants as a target object. For example, Panasonic digital camera Lumix DMC FX-550™ meets this demand with a moving subject tracking function in addition to the face detection and person recognition functions (see Panasonic digital camera DMC FX-550™ manuals). The moving subject tracking function tracks an object designated on the touch panel, and sets it as an AE/AF target. Another model of Panasonic digital camera allows the user to designate a subject of his choice and track it by capturing it within a predetermined frame without using the touch panel, and pressing the shutter button halfway. For example, Sharp cell phone SH-06A™ with a camera function also has a similar object tracking function. As a method of easily designating an object the user wants on the touch panel, for example, there is a technique disclosed in Japanese Patent Laid-Open No. 2006-101186.

As a known method of registering a subject the user wants and detecting it from an input image, for example, an image of a predetermined size containing the subject is registered as a template. Then, a corresponding position within each subsequent image capturing frame is quickly detected using a method described in B. Lucas and T. Kanade, "An iterative image registration technique with an application to stereo vision", Proceedings of Imaging understanding workshop, pp. 121-130. A feature amount called HoG, which is described in N. Dalal and B. Triggs, "Histograms of oriented gradients for human detection", CVPR, 2005, can be extracted and set as registered data. In this case, in detection processing, an input image is scanned using a subwindow equal in size to the registered object image, and the same HoG feature as the registered data is extracted from an image cut out for each subwindow. Then, a match/mismatch of the extracted feature with the registered data is determined using a discriminator such as SVM (Support Vector Machine). If a match occurs, this means that the registered subject exists at the subwindow position. Also, using a method as described in P. Viola and M. Jones, "Rapid Object Detection using a Boosted Cascade of Simple Features", Proc. IEEE Conf. on Computer Vision and Pattern Recognition, Vol. 1, pp. 511-518, December 2001, by determining a plurality of object images designated as a detection target by the user as positive data, and by determining the background data which can be held in advance as negative data, a detection parameter can be learned within the device.

When using the foregoing person authentication function, the user needs to register the object image (e.g., face image) of a person of user's choice in advance in the apparatus. Also when using the user's registered subject detection function, the user needs to select and register an object image he wants. That is, the user needs to register a selected object image when using these functions.

However, this registration operation conventionally differs between functions for use. For example, when the user uses the person recognition function of the above-mentioned digital camera, he first selects "person authentication" from the shooting menu. Further, he selects "registration", and photographs a person's face to be registered in accordance with a guidance displayed at the center of the LCD. Then, he inputs a title code such as a name, completing the registration. Alternatively, when the user takes several pictures of a person's face while setting "auto registration" ON, a screen automatically appears to prompt him to register a frequently photographed person's face. After that, the user can register a person's face by the same procedure. In shooting after registration, the face image of the registered person (e.g., face close to that of the registered person) is detected and preferentially undergoes AE/AF. When using the moving subject tracking function of this camera, the user registers an object by designating the object displayed on the LCD using the touch panel. AE/AF is continuously performed along with the motion of the object. Note that the user can only exclusively use either the moving subject tracking function or person authentication function.

For this reason, when a conventional apparatus includes a plurality of types of subject detection/recognition functions requiring a registration operation to specify a preferential object, the user needs to select and execute the registration operation which differs between the functions, putting a heavy burden on him.

SUMMARY OF THE INVENTION

To solve the above problems, the present invention provides a common object registration operation method in an image processing apparatus having a plurality of types of subject detection/recognition functions, thereby improving usability.

According to one aspect of the present invention, there is provided an image processing apparatus comprising: a designation unit adapted to designate an object image to be registered; a first detection unit adapted to detect a first subject from the designated object image; a first extraction unit adapted to extract a first feature amount for identifying an attribute of the first subject; a second extraction unit adapted to extract a second feature amount for detecting the second subject; a first storage unit adapted to store the first feature amount; and a second storage unit adapted to store the second feature amount, wherein when the first detection unit detects the first subject, the first extraction unit extracts the first feature amount from the object image and the first storage unit stores the extracted first feature amount, and when the first detection unit cannot detect the first subject, the second extraction unit extracts the second feature amount from the object image and the second storage unit stores the extracted second feature amount.

Further features of the present invention will become apparent from the following description of exemplary embodiments (with reference to the attached drawings).

BRIEF DESCRIPTION OF THE DRAWINGS

FIG. 1 is a block diagram exemplifying the arrangement of an image processing apparatus according to the present invention;

FIG. 2 is a flowchart showing an operation in object image registration processing by an image processing apparatus according to the first embodiment;

Figure 3A:
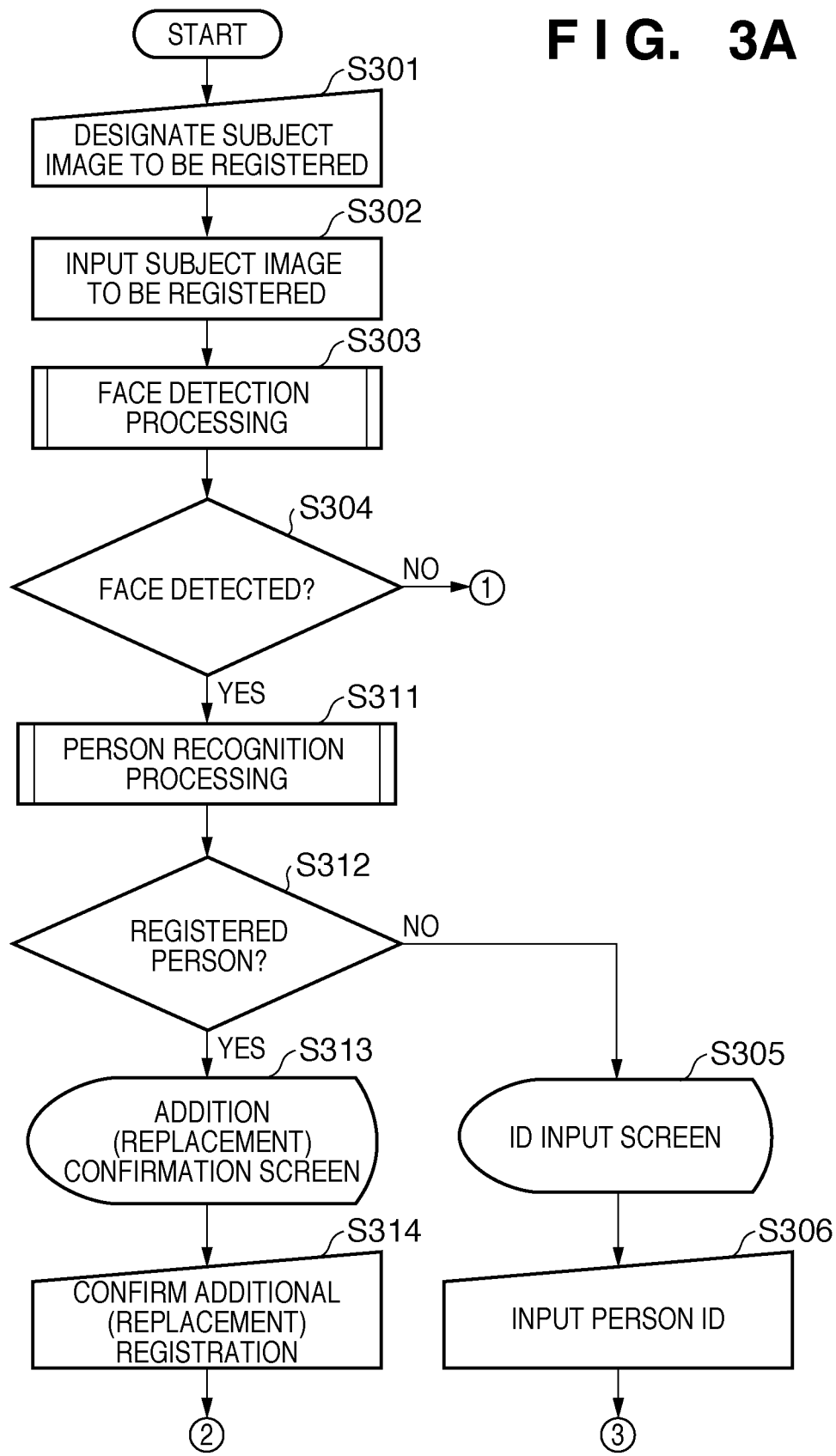
FIGS. 3A and 3B are a flowchart showing an operation in object image registration processing by an image processing apparatus according to the second embodiment.

DESCRIPTION OF THE EMBODIMENTS (First Embodiment)
<Arrangement View of Image Processing Apparatus>

A block diagram showing an arrangement regarding the image recognition processing unit of an image processing apparatus according to the present invention will be explained with reference to FIG. 1. A user interface 101 is formed from a display device such as a display, and an input device including keys and a touch panel. The user interface 101 displays an image and message to the user under the control of a CPU (not shown). In addition, the user interface 101 accepts an instruction from the user depending on the use situation. In the present invention, the user interface 101 functions as even a to-be-registered object image designation unit for designating a subject image to be registered. The user can designate and register a subject image of his choice.

An image input unit 102 inputs an image subjected to detection/recognition processing to the apparatus. The image input unit 102 includes an image capturing camera device (not shown). The image input unit 102 converts an optical image into a digital electrical signal by an image sensor such as a CCD, and inputs the signal into the apparatus. The image input unit 102 generates an image by cutting out an input image into a predetermined size or scaling it into a predetermined size, and transmits image data of the predetermined size to each processing unit.

A face detection processing unit 103 functioning as the first detection unit determines whether the cutout image sent from the image input unit 102 represents a person's face (first subject). This face detection processing algorithm can adopt a technique described in P. Viola and M. Jones, "Rapid Object Detection using a Boosted Cascade of Simple Features", Proc. IEEE Conf. on Computer Vision and Pattern Recognition, Vol. 1, pp. 511-518, December 2001. A face detection parameter storage unit 104 stores a parameter used for detection in the face detection processing unit 103. The face detection parameter storage unit 104 stores parameters generated by mechanically learning many sample images and background images which are prepared in advance by a general-purpose computer outside the image processing apparatus.

When the face detection processing unit 103 determines that the cutout image represents a person's face (first subject), a person recognition processing unit 105 performs person recognition processing for the face image. A person feature data storage unit 106 is a subject feature storage formed from a RAM or the like. The person recognition processing unit 105 checks whether person feature data (first feature amount) stored in the person feature data storage unit 106 functioning as the first storage unit matches feature data extracted from the face image. Then, the person recognition processing unit 105 determines whether the person is registered or unregistered. If the person is a registered person, an attribute of the person is identified. An example of the attribute is a person ID (e.g. name). An image input to the person recognition processing unit 105 is normalized based on, for example, the eye width and face size. The person recognition processing unit 105 determines whether the person matches a person already registered, by using, for example, a method described in A. B. Ashraf, S. Lucey, and T. Chen, "Learning Patch Correspondences for Improved Viewpoint Invariant Face Recognition", Carnegie Mellon University, IEEE International Conference on Computer Vision and Pattern Recognition (CVPR), June 2008. Person feature data (first feature amount) used here is data obtained by extracting a feature by a face image registration processing unit 109 functioning as the first extraction unit in face image registration processing (to be described later). The person recognition processing unit 105 functioning as the first identification unit executes the same feature extraction processing for an input cutout image, and calculates similarity with registered feature data (first feature amount) stored in the person feature data storage unit 106, specifying the person.

The cutout image input from the image input unit 102 is also sent to a user's registered subject detection processing unit 107 functioning as the second detection unit. Based on feature data (second feature amount) registered in advance in a registered subject feature data storage unit 108 functioning as the second storage unit, the user's registered subject detection processing unit 107 determines whether the cutout image represents a subject (second subject) designated by the user. The registered subject feature data storage unit 108 is a subject feature storage formed from a RAM or the like.

A subject (second subject) to be detected by the user's registered subject detection processing unit 107 functioning as the second detection unit is a subject other than a person's face (first subject) to be detected by the face detection processing unit 103. Examples of the subject are an animal (e.g., dog), a plant (e.g., flower), and a vehicle. Registered subject feature data (second feature amount) stored in the registered subject feature data storage unit 108 is subject feature data which is different from person feature data and is extracted from a registered object image by a user designated subject registration processing unit 110 functioning as the second extraction unit in registration processing (to be described later). The registered subject feature data (second feature amount) can be, for example, the HoG feature amount described in N. Dalal and B. Triggs, "Histograms of oriented gradients for human detection", CVPR, 2005.

In this case, in detection processing, the user's registered subject detection processing unit 107 extracts a feature amount (second feature amount) from a cutout image within the subwindow of an input image, and determines a match/mismatch by comparing the extracted feature amount with the amount already registered. For example, the input feature amount and registered amount are vectorized, and their correlation is calculated as similarity. Alternatively, similarity is calculated based on histograms intersection. A match/mismatch is then determined based on the calculated similarity. A discriminator such as SVM (Support Vector Machine) which has already learned may be used. It is also possible to use a cutout image of a predetermined size directly as registered subject feature data (template), and calculate a corresponding position from a larger input image using a method described in B. Lucas and T. Kanade, "An iterative image registration technique with an application to stereo vision", Proceedings of Imaging understanding workshop, pp. 121-130.

In the first embodiment, cutout images input to the respective detection/recognition processing units are equal in size for descriptive convenience. Although not described in detail, the image input unit 102 executes detection/recognition processing after scaling a single input image into a plurality of sizes (generation of pyramid images). This allows detecting and identifying even a target subject larger or smaller than the cutout size in an original input image. Detection/recognition processes corresponding to target subjects having various sizes can be performed using the same detection/identification parameter.

<Registration Processing Sequence>

Figure 5:
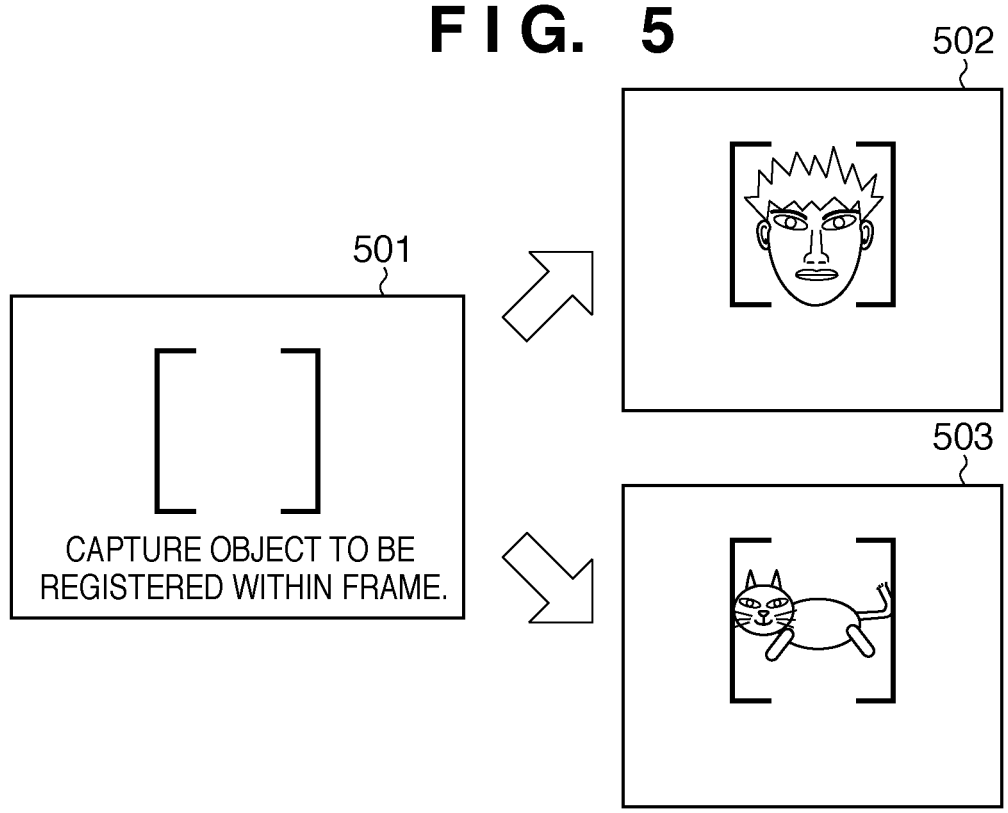
FIG. 5 is a view showing an example of a user interface for designating an object image to be registered.

A registration processing sequence according to the first embodiment will be described with reference to FIG. 2. When the process starts in the object image registration mode, the user is prompted to designate an object image of his choice in step S201. FIG. 5 exemplifies the to-be-registered object image designation method. A screen 501 is the LCD screen of the image capturing apparatus that displays a frame for designating a subject to be registered. A message on the screen prompts the user to capture a subject to be registered within the frame. Since the LCD screen displays an image to be captured, the user zooms in an object to be registered fully within the frame, as represented by screens 502 and 503. Then, he presses the shutter button, designating an object image to be registered.

After the user designates an object image to be registered, the image input unit 102 cuts out the object image of a predetermined size, and inputs it to the apparatus in step S202. At this time, the image zoomed in almost fully within the frame is loaded (see FIG. 5), and if necessary, scaled into the predetermined size.

In step S203, the face detection processing unit 103 performs face detection processing for the object image to be registered.

In step S204, it is determined whether a face has been detected in the object image. If a face has been detected, the process advances to step S205. If no face has been detected, the process advances to step S209.

Figure 4A:
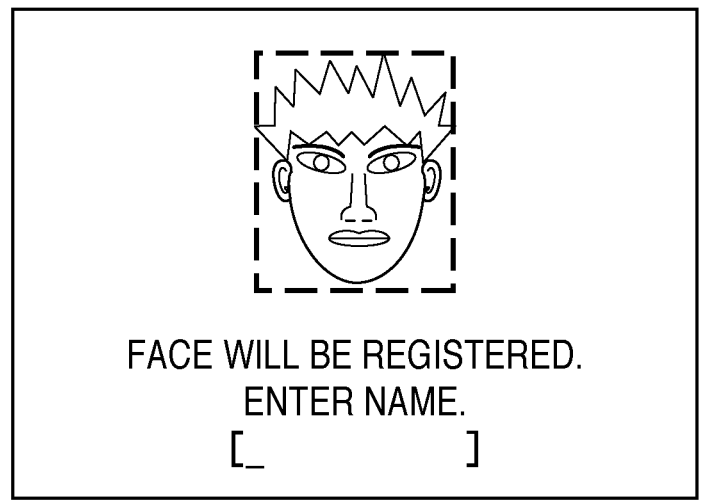
FIGS. 4A and 4B are a view exemplifying a screen which displays a message to prompt the user to input a title code in registration processing.

If a face has been detected, the face image is registered. For this purpose, in step S205, a screen (input screen) is displayed to prompt the user to input a title code indicating a person. This input screen is, for example, like that shown in FIG. 4A. In step S206, the user inputs a title code (=name, nickname, or the like; in FIG. 2, the title code is a person ID) corresponding to the face image to be registered.

After the user inputs the title code in step S206, a person identification feature (first feature amount) is extracted from the face image in step S207. The face image registration processing unit 109 performs this extraction processing, extracting a feature amount suited to identify a person, as described in A. B. Ashraf, S. Lucey, and T. Chen, "Learning Patch Correspondences for Improved Viewpoint Invariant Face Recognition", Carnegie Mellon University, IEEE International Conference on Computer Vision and Pattern Recognition (CVPR), June 2008. In step S208, the person feature data storage unit 106 stores the extracted feature amount as person feature data (first feature amount).

Figure 4B:

If no face has been detected, it is determined that the object image to be registered is not a person's face, and feature extraction processing is done for user's registered subject detection processing in step S209. At this time, a message may be displayed to confirm whether to actually register the object image, as shown in FIG. 4B. It is also possible to prompt the user to input the title of a target subject, similar to registration of a person's face image. The feature amount extracted in step S209 is the HOG (Histograms of oriented gradients) amount described in, for example, N. Dalal and B. Triggs, "Histograms of oriented gradients for human detection", CVPR, 2005. In step S210, the registered subject feature data storage unit 108 stores the object image as registered subject feature data (second feature amount).

Note that the feature amount (first feature amount) extracted in step S207 of the registration processing sequence is used to discriminate person's faces which are similar images. To the contrary, the feature amount (second feature amount) extracted in step S210 is suitable for discriminating the background and target subjects having a variety of shapes. Since characters of identification/detection targets are different, different feature amounts are used in general, but the user need not be aware of it.

<Detection/Recognition Processing Sequence>

Figure 7A:
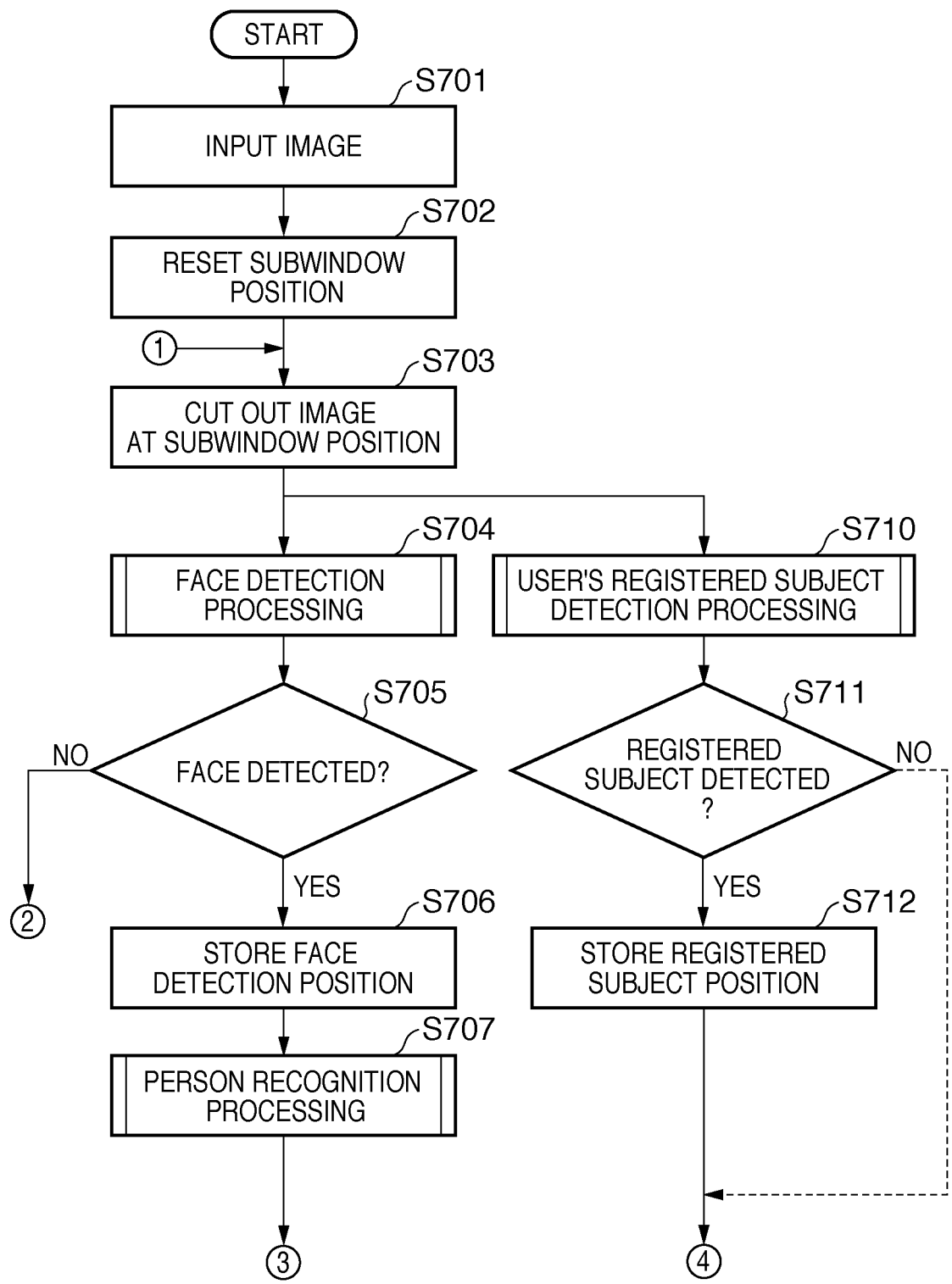
FIGS. 7A and 7B are a flowchart showing an operation in detection/recognition processing for an input image.
Figure 7B:
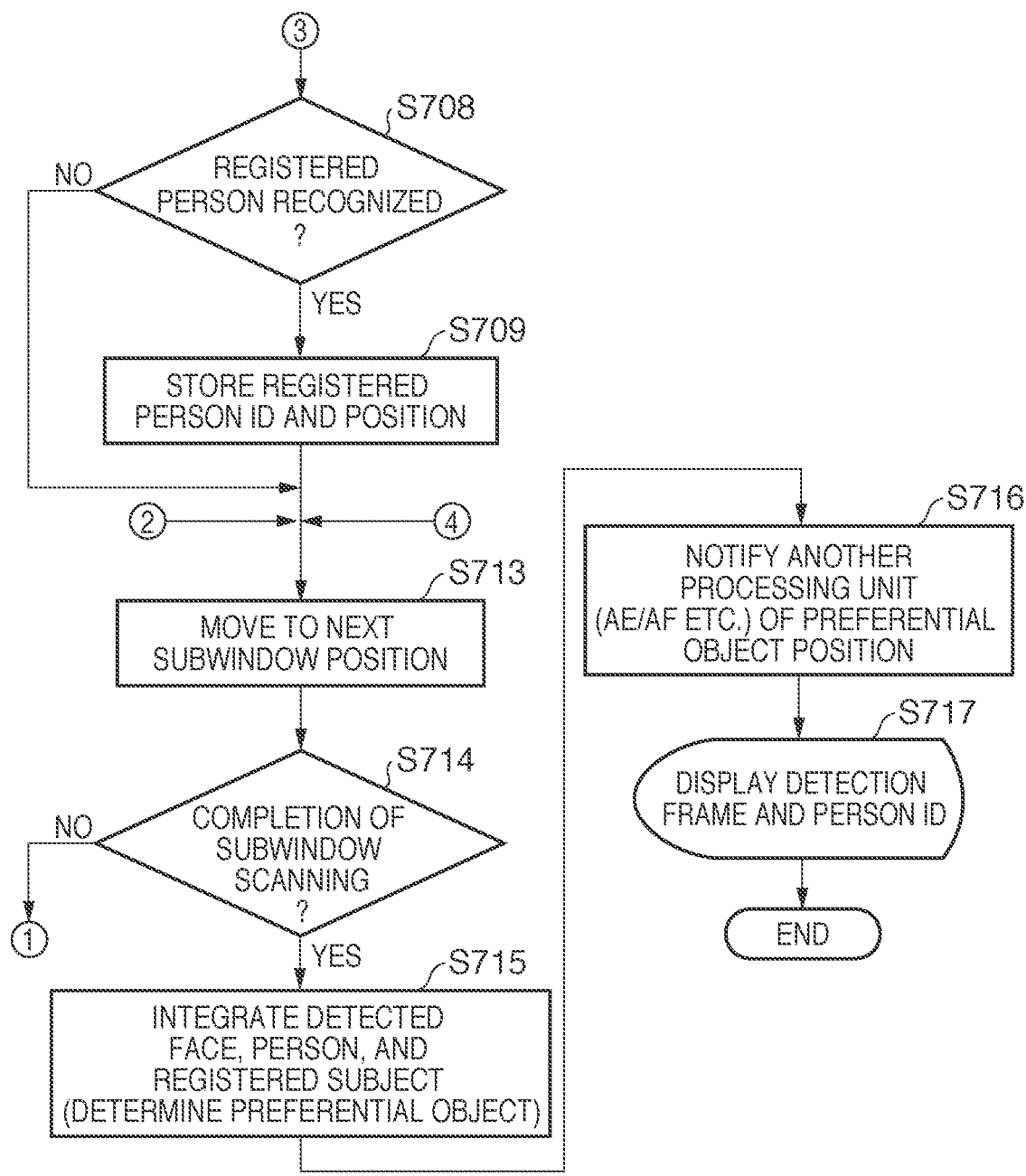

A flowchart showing a detection/recognition processing sequence for an input image in the image processing apparatus according to the first embodiment will be explained with reference to FIGS. 7A and 7B. Note that detection/recognition processing according to the first embodiment is executed using the image processing apparatus shown in FIG. 1 for a preview image which is periodically captured until the user presses the shutter button in image capturing. Based on the detection/recognition processing result, control is performed in subsequent processing to automatically focus on or expose a subject determined to be a preferential object, when the preferential object is detected from the image. At the same time, a position in an image where the detected/identified subject exists, and a recognized attribute (title code) are presented to the user.

Figure 8A:
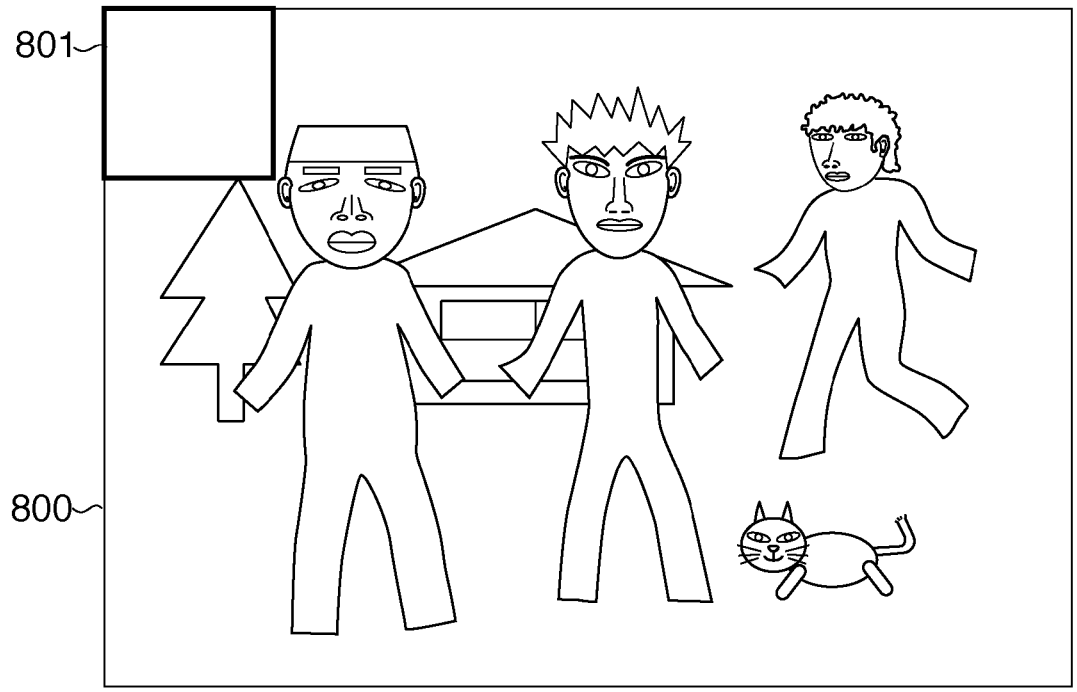
FIG. 8A is a view for explaining scanning of a subwindow in detection/recognition processing.

In step S701, an image sent from the image capturing apparatus is received. This image is an input image of a predetermined size (e.g., VGA size) such as an input image 800 in FIG. 8A. A processing sequence for input images of a single size will be explained for descriptive convenience. In practice, however, pyramid images are processed, so target subjects having various sizes can be detected, as described above.

The purpose of detection processing is to determine whether an image contains a target subject, and if so, specify the position. This processing is performed for an image cut out from each subwindow of a predetermined size. A subwindow 801 in FIG. 8A indicates the initial position of the subwindow. Upon completion of detection processing at this position, the subwindow moves right by one pixel (or a predetermined number of pixels), and detection processing is performed. The same detection processing is repeated, and when the subwindow reaches the right end, the subwindow moves below by one line (or a predetermined number of lines), and the same processing is done. By executing this processing (scanning) for the entire image, whether a target subject exists at any subwindow position can be specified. In step S702, the subwindow position is reset to have an initial value.

In step S703, an image at the subwindow position is cut out. The cutout image undergoes face detection processing in step S704, and user's registered subject detection processing in step S710.

In the first embodiment, these two detection processes are done for subwindow images of the same size, so a common subwindow is usable for both processes. However, the size may be changed. In this case, a plurality of types of subwindows are set to execute dedicated cutout processes.

In the first embodiment, the image processing apparatus has the arrangement shown in the block diagram of FIG. 1, and the face detection processing unit 103 and user's registered subject detection processing unit 107 are executed by different hardware components. Thus, the two detection processes can be performed parallelly. Needless to say, these detection processes may be executed sequentially in accordance with an actual configuration and conditions.

A face detection processing sequence in steps S704 to S709 will be explained. In step S704, face detection processing is done by referring to the face detection parameter storage unit 104. Upon completion of the face detection processing in step S704, it is determined in step S705 whether a face has been detected in an input subwindow. If a face has been detected, the process advances to step S706 to store the processed subwindow position. Further, the process advances to step S707 to perform person recognition processing. In the person recognition processing, the person recognition processing unit 105 in FIG. 1 collates a feature extracted from a face in the subwindow with person feature data (first feature amount) which has been registered in the above-described registration processing and is stored in the person feature data storage unit 106. When a plurality of persons are registered, collation processing is performed by a plurality of number of times. If a registered person has been recognized in step S708, its title code and the processed subwindow position are stored in step S709. The process then advances to step S713.

If no face has been detected in step S705, the process directly advances to step S713. Also, if no registered person has been recognized in step S708, the process advances to step S713.

A user's registered subject detection processing sequence in steps S710 to S712 will be described. In step S710, the user's registered subject detection processing unit 107 executes subject detection processing based on registered subject feature data (second feature amount) stored in the registered subject feature data storage unit 108. When a plurality of kinds of subjects are registered, the subject detection processing is repeated to determine whether any subject is contained. If it is determined in step S711 that a registered subject has been detected, the subwindow position during processing is stored together with the detected subject information in step S712. After that, the process advances to step S713. Upon completion of face detection processing, face recognition processing (person recognition processing), and subject detection processing, the subwindow position moves to the next position in step S713, as described above (see FIGS. 8A and 8B). If the position is a final position, that is, exceeds the lower right position of the input image, scanning is completed, and the process advances to step S715. If scanning is not completed, the process returns to step S703 to perform detection/recognition processing for the next subwindow.

In step S715, pieces of position information of the face, person, and registered subject which have been detected by scanning are integrated. In this processing, for example, when subjects of the same kind exist close to each other within a range of only several pixels, they are integrated into one subject. When a face and registered subject are detected at almost the same position, only either result is left in accordance with predetermined priority or detection reliability. When the same person is recognized at a plurality of portions in one image by person recognition, a person's image with high reliability is left, and the remaining images are regarded as unregistered persons. Even when size- or angle-specific detection is done, the results are integrated in this step.

In step S716, a plurality of objects detected in the image are prioritized, and another processing unit which performs autofocus, autoexposure, and the like is notified of position information of a preferential object. For example, for the face, priority is set higher for a registered person who has been recognized, than person who is not registered. Priority levels set in advance are assigned to registered persons, or priority is set higher for a face having a larger size. If only an unregistered person or a subject other than the face has been detected, priority is determined based on the size or the distance from the center. The user can also designate priority in advance.

Figure 8B:
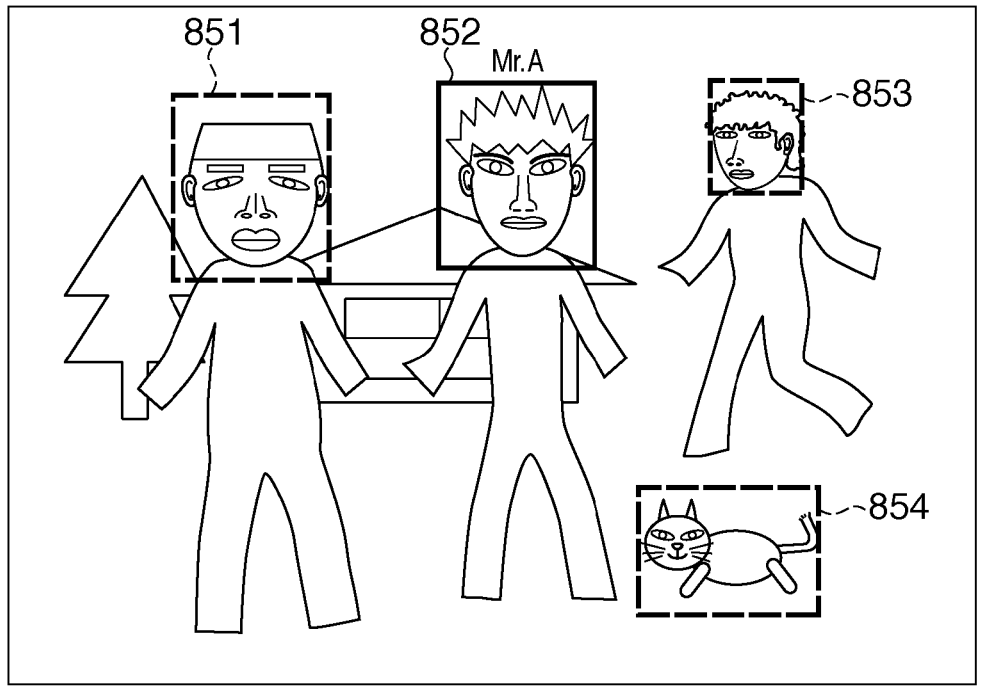
FIG. 8B is a view exemplifying an image which displays the detection/recognition processing result of the image processing apparatus according to the first embodiment.

Finally in step S717, the frame on the LCD screen indicates the position of the detected target subject. When the target subject is a face and the person has been recognized, the person ID is displayed at the face position. FIG. 8B exemplifies a screen displaying the detection processing result of the input image 800. Frames 851 to 853 indicate positions where faces have been detected. In the frame 853, a face whose size is small and different from that of a face detected in the frame 851 or 852 is detected. In the frame 852, a detected face is the face of a registered person (ID is "Mr. A"). In a frame 854, "cat" registered as a user's registered subject is detected.

As described above, according to the first embodiment, the user need not pay attention to the difference between registration processing of feature data (first feature amount) for identifying a person and that of feature data (second feature amount) for detecting a subject the user wants. The user suffices to simply designate a subject to be registered using a common registration operation interface. Subsequently, he can easily complete the operation in accordance with the apparatus guidance.

(Second Embodiment)

The first embodiment has described a method of automatically selecting person identification registration processing or user's registered subject detection registration processing for an object image designated to be registered. In addition to this, the second embodiment performs processing of determining whether an object image designated to be registered matches feature data which has already been registered. Note that the image processing unit of an image capturing apparatus according to the second embodiment has the same arrangement as that in the block diagram of FIG. 1.

Figure 3B:
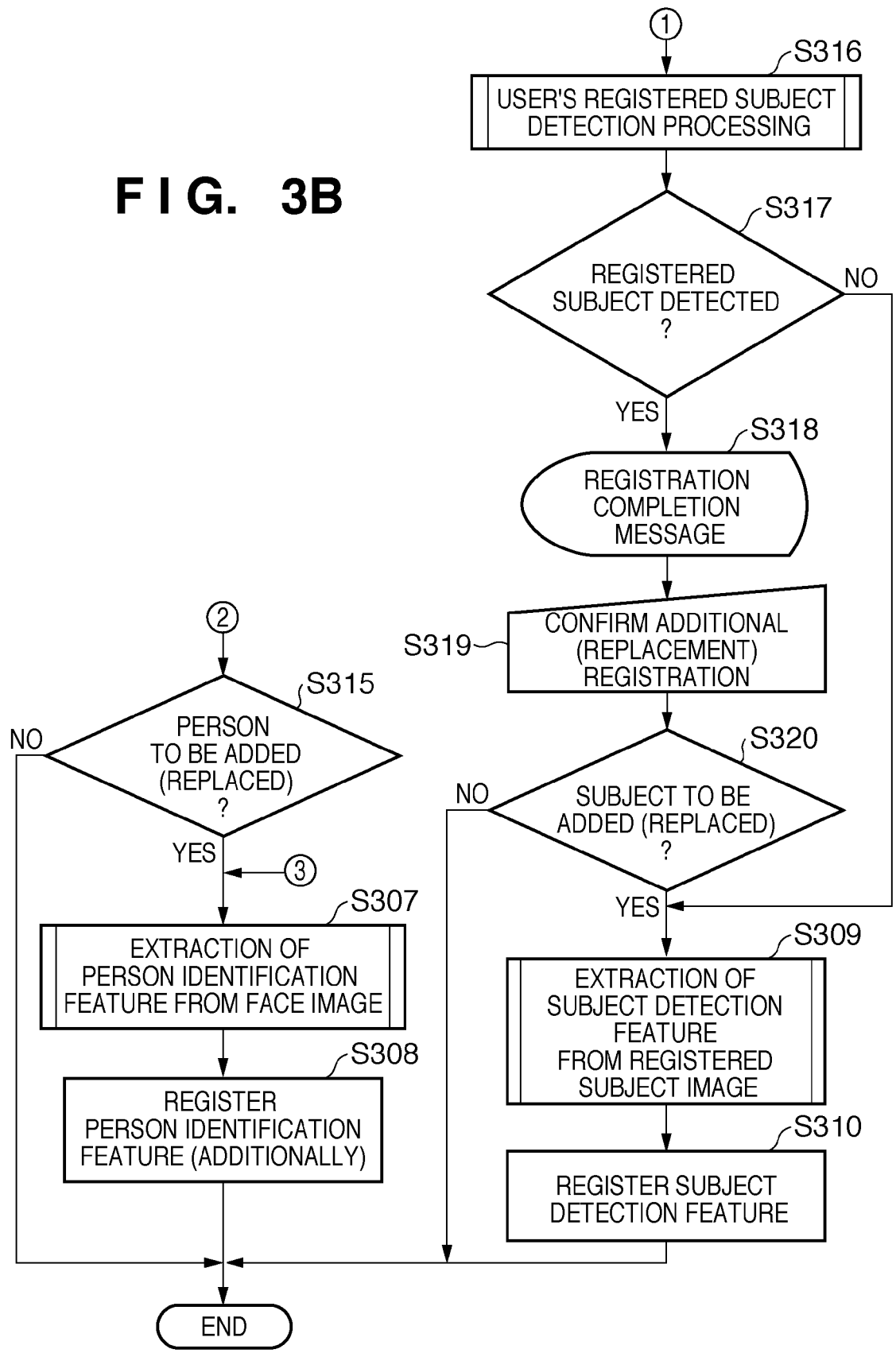

A registration processing sequence according to the second embodiment will be described with reference to FIGS. 3A and 3B. In the flowchart shown in FIGS. 3A and 3B, processes in steps S301 to S310 are the same as those in steps S201 to S210 of FIG. 2, and a detailed description thereof will not be repeated.

If it is determined in step S304 that an object image to be registered is a face, the process advances to step S311 to perform person recognition processing in the second embodiment. The person recognition processing is the same as the processing described in the detection/recognition processing sequence in the first embodiment, and is executed by a person recognition processing unit 105. More specifically, the person recognition processing unit 105 collates person feature data (first feature amount) which has already been registered in a person feature data storage unit 106, with feature data extracted from the face of the object image to be registered.

If it is determined in step S312 that the face of the object image to be registered matches a person who has already been registered, the title code (person ID) is specified. In step S313, the specified title code is displayed, and a message is displayed to confirm whether to register feature data of the current object image to be registered as additional data of the code. When the capacity of the registration area or the recognition processing speed is limited, a confirmation screen may be displayed to confirm whether to replace feature data (first feature amount) which has already been registered, with feature data of the current object image to be registered, instead of additional registration.

In step S314, the user is prompted to reply "YES" or "NO". If it is determined in step S315 that the user replies "add (or replace)", the process advances to step S307 to extract a person identification feature.

If it is determined in step S312 that the face of the object image to be registered does not match a person who has already been registered, processes in steps S305 to S308 are executed to newly register person feature data together with a title code, similar to the first embodiment.

In the second embodiment, person feature data has already been extracted in step S311. By storing the extracted person feature data, the same processing need not be done again in step S307. Hence, the process in step S307 can be skipped to only register the person feature data in step S308.

In the second embodiment, if no face is detected from an object image to be registered in step S304, user's registered subject detection processing is performed in step S316. This processing is also the same as that described in the detection/recognition processing sequence according to the first embodiment. It is determined whether the object image to be registered is a subject whose feature data (second feature amount) has already been registered in a registered subject feature data storage unit 108.

If it is determined in step S317 that the designated subject is a registered person, the process advances to step S318 to display a message that the designated subject has already been registered, and confirm whether to additionally register the designated subject (or replace the registered data with the designated subject). In step S319, the user is prompted to input a reply. If it is determined in step S320 that the user replies "YES", a user subject detection feature is extracted in step S309. Similar to person recognition feature data, subject detection feature data which has already been extracted in step S316 can be directly used and registered in step S310.

As described above, according to the second embodiment, the user can easily know whether a subject to be registered has already been registered. The second embodiment can prevent wasteful consumption of the storage area or a decrease in processing speed by unnecessary registration.

(Third Embodiment)

The first embodiment has described a method of designating an object image to be registered by capturing an object within a predetermined frame, as shown in FIG. 5. This method does not require any special hardware for registration and can be implemented at low cost, but requires a somewhat cumbersome operation. The third embodiment allows more easily designating an object to be registered.

Figure 6:
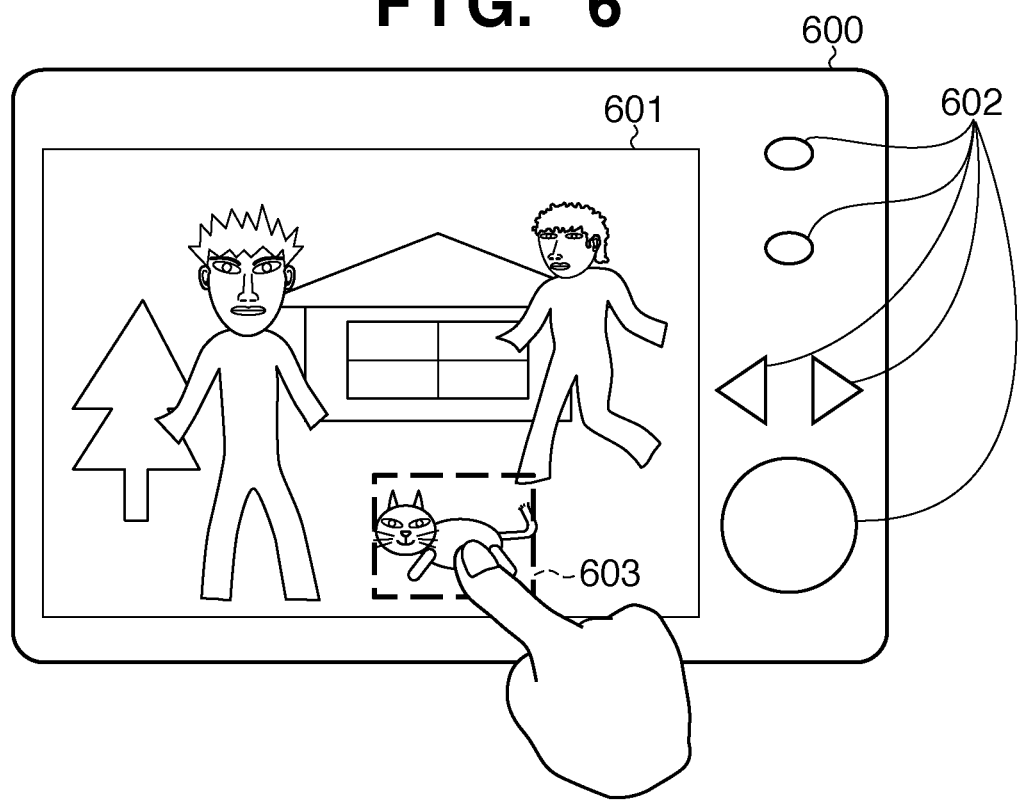
FIG. 6 is a view showing another example of the user interface for designating an object image to be registered.

A to-be-registered object image designation user interface in an image processing apparatus according to the third embodiment will be explained with reference to FIG. 6. The user interface of an image capturing apparatus 600 includes an LCD panel 601 and a plurality of hard keys 602. The LCD panel 601 is covered with a touch panel, and can detect a coordinate point touched by the user with his finger.

When the user manipulates the hard keys 602 to change the apparatus to the registration mode, the touch panel becomes valid. The user touches a position where an object to be registered is displayed, that is, the position of a frame 603 with his finger, indicating a subject to be registered to the apparatus. The image capturing apparatus 600 specifies the coordinate point touched with the finger on the image, and cuts out a range of a predetermined size as an object image to be registered. Alternatively, the image capturing apparatus 600 may cut out, as an object image to be registered, a range containing adjacent pixels regarded to be the same as a pixel at the position touched with the finger. Instead of shifting to the registration mode by a pre-manipulation, the image capturing apparatus may automatically shift to the registration processing mode upon detecting pressing of the touch panel during image capturing. In subsequent registration processing, the same processing as those described in the first and second embodiments is performed.

In the third embodiment, an object position is designated on the touch panel. However, an object position may be designated by, for example, moving the pointer cursor using the mouse or cursor key.

According to the third embodiment, the user can more intuitively designate an object to be registered. An object to be registered need not be captured at the center of the frame, and thus can be registered even when registering an object in a fixed camera or when displaying a captured image and registering an object.

(Fourth Embodiment)

The first to third embodiments have described an image processing apparatus applied to an image capturing apparatus typified by a digital camera, but an application of the present invention is not limited to this. For example, the present invention is also applicable to a case in which an image forming apparatus such as a printer executes desired image processing preferentially for a specific subject contained in image data and then prints. In this case, the image input unit 102 receives an image via a network or the like, and performs the same process as the aforementioned embodiments. The image input unit 102 may also process an image stored in a memory, a hard disk drive, or the like.

The first to third embodiments have described, as a person's face detection processing unit, a detection processing unit which learns detection parameters in advance outside the apparatus, but an application of the present invention is not limited to this. For example, a detection unit corresponding to a face detection processing unit 103 in FIG. 1 may be a human body detection processing unit which detects the whole body image of a person, and a person recognition processing unit 105 may be a person recognition processing unit based not on facial features but on features related to their whole body. An attribute determined in recognition processing by the person recognition processing unit 105 is not limited to identification of an individual. The person recognition processing unit 105 may be another subject attribute recognition processing unit such as an attribute recognition processing unit for discriminating a specific expression, or an attribute recognition processing unit for estimating the age of a person. A registration processing unit corresponding to a face image registration processing unit 109 in this case receives a person's image having an attribute such as a specific expression image or specific age, and extracts a feature.

A detection processing unit corresponding to the face detection processing unit 103 may be one for another subject, for example, general dog. A recognition processing unit corresponding to the person recognition processing unit 105 may recognize, as an attribute, whether the dog is of a specific dog type or user's pet. Even in this case, the present invention is applicable.

A detection processing unit corresponding to the face detection processing unit 103 may use not a detection parameter learned in advance, but one learned in the apparatus. In this case, the detection processing unit can be a user's registered subject detection processing unit 107. Individual or attribute identification processing by a subsequent recognition processing unit may be done for only registered subject feature data stored in a specific registered subject feature data storage unit 108.

According to the present invention, registration processing suited to one of a plurality of types of subject detection/recognition functions installed in the apparatus is automatically selected for an object image designated in the registration operation. The user suffices to always perform the same registration operation, improving usability.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-247109, filed Oct. 27, 2009, which is hereby incorporated by reference herein in its entirety.

What is claimed is:

1. An image processing apparatus comprising:
a designation unit adapted to designate an object image to be registered;
a first detection unit adapted to detect a first subject from the designated object image;
a first extraction unit adapted to extract a first feature amount for identifying an attribute of the first subject;
a second extraction unit adapted to extract a second feature amount for detecting the second subject;
a first storage unit adapted to store the first feature amount; and
a second storage unit adapted to store the second feature amount,
wherein when said first detection unit detects the first subject, said first extraction unit extracts the first feature amount from the object image and said first storage unit stores the extracted first feature amount,
wherein when said first detection unit cannot detect the first subject, said second extraction unit extracts the second feature amount from the object image and said second storage unit stores the extracted second feature amount,
wherein the image processing apparatus further comprises a first identification unit adapted to identify an attribute of an object in an input image detected by said first detection unit based on the first feature amount stored in said first storage unit, and
wherein when said first identification unit identifies that the attribute of the object image designed by said designation unit does not match the first feature amount stored in said first storage unit, said first storage unit stores the feature amount which is extracted from the object image as a new first feature amount of a different first subject.

2. The apparatus according to claim 1, wherein the image processing apparatus further comprises a second detection unit adapted to detect the second subject in an input image based on the second feature amount stored in said second storage unit.

3. The apparatus according to claim 1, wherein when said first detection unit cannot detect the first subject in the object image designated by said designation unit, said second storage unit stores the second feature amount after a user confirms to store the second feature amount in said second storage unit.

4. The apparatus according to claim 1, wherein the image processing apparatus further comprises an input unit adapted to prompt a user to input a title indicating the attribute of the first subject when storing the first feature amount in said first storage unit.

5. The apparatus according to claim 1, wherein when said first identification unit identifies that the attribute of the object image designed by said designation unit matches the first feature amount stored in said first storage unit, said first storage unit asks a user whether the feature amount extracted from the object image is to be stored as a new first feature amount.

6. The apparatus according to claim 1, wherein said designation unit designates the object image while an object to be registered is captured within a predetermined frame.

7. An image processing method comprising:
a designation step of designating an object image to be registered;
a first detection step of detecting a first subject from the designated object image;
a first extraction step of extracting a first feature amount for identifying an attribute of the first subject from the object image, when the first subject is detected in said first detection step;
a second extraction step of extracting a second feature amount for detecting the second subject from the object image, when the first subject cannot be detected in said first detection step;
a first storage step of storing the first feature amount in a first storage unit, when the first feature amount is extracted in said first extraction step; and
a second storage step of storing the second feature amount in a second storage unit, when the second feature amount is extracted in said second extraction step,
wherein the image processing method further comprises a first identification step of identifying an attribute of an object in an input image detected by said first detection step based on the first feature amount stored in the first storage unit, and wherein when said first identification step identifies that the attribute of the object image designed by said designation step does not match the first feature amount stored in the first storage unit, said first storage step stores the feature amount which is extracted from the object image as a new first feature amount of a different first subject.

8. A non-transitory computer-readable storage medium storing a program for causing a computer to execute an image processing method defined in claim 7.

* * * * *